July 29, 1952     W. E. BENEDICT ET AL     2,605,204
COVERING MATERIAL AND METHOD OF PRODUCING THE SAME
Filed Dec. 10, 1949
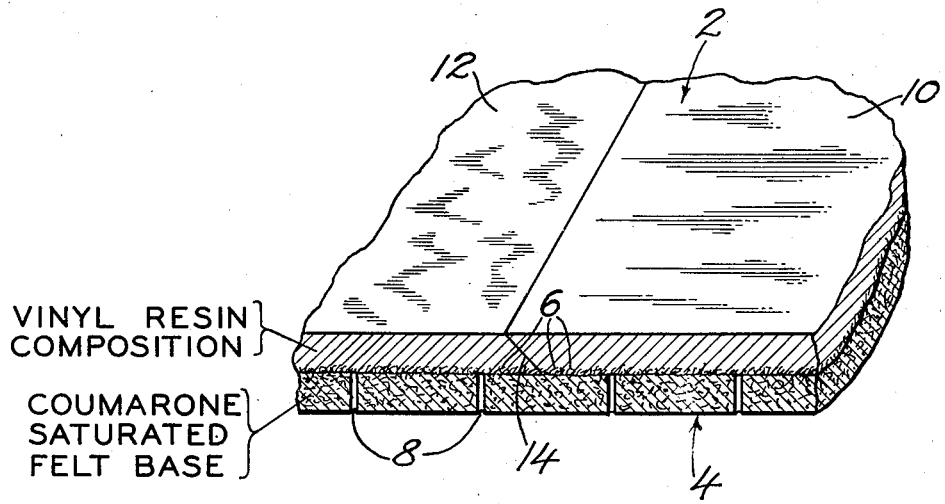
VINYL RESIN COMPOSITION
COUMARONE SATURATED FELT BASE
INVENTORS
WALTER E. BENEDICT
BY EUGENE B. McBRIDE
*Albert Sperry*
ATTORNEY

Patented July 29, 1952

2,605,204

UNITED STATES PATENT OFFICE 2,605,204

COVERING MATERIAL AND METHOD OF PRODUCING THE SAME

Walter E. Benedict, Newtown, and Eugene B. McBride, Philadelphia, Pa., assignors to Sloane-Blabon Corporation, Hutchinson Mills, N. J., a corporation of Delaware Application December 10, 1949, Serial No. 132,364

9 Claims. (Cl. 154—139)

This invention relates to floor coverings and to materials for use in covering walls, table tops and counters. The invention further relates to methods of producing such materials.

It has been common practice heretofore to produce floor coverings wherein there is a base layer or backing formed of saturated felt provided with a wear-resisting decorative layer of an oleo-resinous composition such as linoleum or oil paint. The oleo-resinous compositions are applied to the backing while in a sticky or tacky condition and therefore adhere firmly to the backing even when a sealing coat is used to prevent the saturant of the felt base from penetrating into and softening or discoloring the wear resisting layer. After being applied to the base the product is cured to render the oleo-resinous composition permanently dry, hard and wear-resisting.

Various compositions suitable for use as floor coverings have been developed wherein the principal resinous constituents are vinyl resins of the class consisting of the polymers and copolymers of vinyl chloride and vinylidene chloride. Such compositions have wear resisting properties superior to the usual oleo-resinous compositions and can be produced in colors which are clearer and brighter than those generally obtainable in linoleum compositions. Moreover, the vinyl resin compositions require little or no curing and are substantially more flexible than cured oleo-resinous products. However, vinyl resins of the class referred to and compositions containing such resins are notorious for their lack of adhesive properties and the difficulties encountered in bonding the resins or compositions to other surfaces. For this reason vinyl resin compositions have not heretofore been applied directly to felt base materials and similar backings.

In accordance with the present invention a novel type of saturated felt is used wherein the character and amount of saturant are such as to provide a combined physical and adhesive bond between the felt and vinyl resin composition. In this way it is possible to produce a firm and permanent attachment of the wear receiving layer to the felt base layer. The saturants employed are coumarone and indene resins and they are incorporated in the felt in relatively limited amounts equalling from about 70 to 90% by weight of the dry felt.

One of the objects of the present invention is to provide a novel type of floor covering embodying a wearing surface formed of a vinyl resin composition.

Another object of the invention is to provide floor coverings wherein a vinyl resin composition is secured to a felt base material by a combined physical and adhesive bond.

A specific object of the invention is to provide methods of securing vinyl resin compositions to a felt base material in a manner to cause fibers of the felt base to be at least partially embedded in the resinous composition.

These and other objects and features of the present invention will appear from the following description thereof in which reference is made to the figure of the accompanying drawing.

The figure of the drawing is a diagrammatic perspective view of a portion of a typical product embodying the present invention.

The wear resisting materials used in accordance with the present invention are those which contain resins of the class consisting of the polymers and copolymers of vinyl chloride and vinylidene chloride. The polymers may be polyvinyl chloride or polyvinylidene chloride, whereas typical copolymers of the class are vinyl chloride-vinyl acetate, vinyl chloride-vinylidene chloride, vinyl chloride-ethyl acrylate, vinyl chloride-vinyl acetate-vinyl alcohol (a trimer), and vinylidene chloride-vinyl acetate. Other vinyl resins of this class may be used. Certain of such resins and compositions containing the resins as a binder exhibit greater adhesive properties than others. Nevertheless the vinyl resins and compositions as a class are characterized by substantially less adhesiveness than are the oleo-resinous materials heretofore used in the manufacture of floor coverings.

The vinyl resin compositions employed as a wear resisting layer preferably contain a resin, a plasticizer, a filler, and a coloring agent. The proportions of the ingredients may vary considerably depending upon the density and flexibility required in the finished product and the type of resin, plasticizer and filler used. In general the most satisfactory compositions for use as the wear resisting layer of floor coverings contain about 25% to 50% by weight of vinyl resin and from about 10% to 30% of a plasticizer, the balance being filler and pigment. The ingredients are preferably selected and proportioned to provide a composition having a melting or softening point in the neighborhood of about 210° F. to 250° F.

The felt base material employed may be any of the conventional felts containing wool, cotton, hair or other fibers. However, the saturant used is selected from those which are at least partially compatible with the vinyl resin of the wear resisting layer and are used in amounts substantially less than is usual in producing the asphalt saturated felts of conventional oleo-resinous floor coverings. The preferred saturants are coumarone and indene resins having a relatively high melting point which may be as high or higher than that of the vinyl resin. A plasticizer, such as a petroleum oil, is preferably used with the coumarone resin in amount sufficient to afford a viscosity under the conditions of saturation which will insure effective penetration of the saturant and yet preserve the desired flexibility in the finished felt. The saturant preferably contains a major proportion of the resin and a minor proportion of plasticizer. Thus, for example, when using a coumarone resin having a melting point of about 260° F., three parts of petroleum oil may be added to seven parts of the coumarone resin. The melting point of such a saturant will be in the neighborhood of 180° F. to 200° F. When the resin has a lower melting point, say 230° F. a lesser amount of plasticizer is required to produce a saturant of the desired viscosity and melting point.

The felt may be saturated in any conventional manner to produce a sheet containing about 8 parts by weight of saturant to 10 parts by weight of dry felt. It is found that when the weight of the saturant is less than about 70% of the weight of the dry felt, the felt is too weak to withstand the normal use in a floor covering. However, when the weight of the saturant exceeds about 90% of the weight of the dry felt, the bond between the felt base and the wear resisting layer of vinyl resin composition is weakened. Those coumarone saturated felts wherein the amount of saturant is equal to from about 70% to 90% of the weight of the dry felt have adequate strength to provide a durable backing layer and adequate concentration of the saturant to permit at least partial blending of the vinyl resin and saturant. No sealing coat is used between the wear resisting layer and felt and under the action of heat and pressure there is at least limited fluxing of the saturant with the wear receiving layer so that the compatibility of the saturant with vinyl resins insures an effective adhesive bond between the layers. On the other hand the degree of saturation is not sufficient to preclude the action of the fibers of the felt in establishing a mechanical bond with the vinyl resin composition by the embedding of fibers of the base in the wear resisting layer under the action of heat and pressure.

Another desirable characteristic of felt base backing sheets saturated as described resides in their ability to split in removing the floor covering from a surface to which the finished product has been bonded. In such cases the floor covering can be removed, leaving only a thin layer of felt adhering to the floor and capable of ready removal without injury to the floor. That part of the backing sheet which remains bonded to the decorative wear receiving layer is thick enough to permit the product to be relayed in the same or another location.

A typical form of product embodying the present invention is shown in the drawing wherein the resinous wear receiving layer is indicated at 2 and the saturated felt layer is indicated at 4. Those layers are securely held together by the combined action of the perhaps limited bond between the vinyl resin composition and the coumarone saturant and the mechanical retention of the wear resisting layer by the fibers 6 which project from the base layer and are partially embedded in the wear receiving layer. In practice the felt layer 4 is preferably perforated as shown at 8. These perforations need only be pin holes spaced an inch or so apart to permit the escape of trapped air or volatiles through the felt base when the layers are pressed together at elevated temperature.

In producing floor coverings or other products embodying the present invention the vinyl resin composition is sheeted and applied to the saturated felt base material. The assembled layers are then subjected to heat and pressure to bond the layers together. The temperature at which the sheets are pressed is preferably at or above the melting or softening points of both the vinyl resin and saturant. Thus in a typical case the saturant for the felt is a coumarone resin having a melting point of 260° F. and softened with petroleum oil to have a softening or melting point of about 180° F. To this felt there is applied a sheet of polyvinyl chloride composition having a melting point of 225° F. The assembled sheets are thereafter pressed together at a temperature of about 260° F. whereupon the relatively free fibers of the felt become embedded in the sheeted polyvinyl chloride composition affording a mechanical bond and the saturant fluxes with the polyvinyl chloride composition to provide an adhesive bond.

It is preferable to use a flat press and prior to pressing a sheet of waxed paper is placed between the platen of the press and the exposed surface of the vinyl resin composition. In this way sticking of the composition to the platen is prevented. The waxed paper is allowed to remain in contact with the composition for a short period after pressing and is then stripped from the product. When the paper is coated with a paraffin wax there is probably some plasticizing of the surface of the wear resisting layer by the wax. In any event the paper sheet serves to reduce the initial shrinkage of the vinyl resin composition on release of pressure and thus prevents the formation of craters and high spots in the surface of the finished sheet.

In forming products having an extended area exceeding the area of the platen of the press it is necessary to subject successive areas of the assembled layers to pressing operations. In such cases, and when forming inlaid patterns, the sheets or pre-cut pieces of the vinyl resin composition indicated at 10 and 12 in the drawing are placed on the upper face of the backing material with their edges in contact or slightly overlapping as shown at 14. Thereafter upon pressing the assembly the vinyl resin composition is fluxed sufficiently to cause the edges 14 to be permanently bonded together to form a unitary, integral layer of wear resisting material. Tests made with products produced in this manner show no tendency to crack or separate in the bonded area when passed about a mandrel one inch in diameter. The bonded joint thus produced is in marked contrast with the joint between adjacent pieces of conventional inlaid linoleum products which tend to open up when passed about a mandrel less than four inches in diameter.

The present invention is not limited to products in which the wear resisting layer is formed of pre-sheeted vinyl resin composition since the composition may initially be in granular form to produce a granite type of decorative surface in the finished product. It will also be apparent that the conditions employed in pressing the assembled layers of material can be varied considerably and will depend in part on the nature and proportions of the vinyl resin and other ingredients used in the composition forming the wear resisting layer. Similarly the conditions may vary with the amount and nature of the saturant used in the felt base material.

In view thereof it should be understood that the particular embodiments of the invention herein described are intended to be illustrative only and are not intended to limit the scope of the invention.

We claim:

1. A covering material comprising a layer of felt base material containing a saturant including a major portion of coumarone resin and in amount equal to from 70 to 90% of the dry weight of the felt, and a layer of a wear resisting composition containing a vinyl resin secured directly to the felt base material with some of the fibers of the felt base partially embedded in said wear resisting composition.

2. A covering material comprising a layer of felt base material containing a saturant including a major portion of coumarone resin and having a melting point of about 200° F., the saturant being present in the felt in amount equal to from 70 to 90% of the dry weight of the felt, and a layer of a wear resisting composition containing a vinyl resin secured directly to the felt base material with some of the fibers of the felt base partially embedded in said wear resisting composition.

3. A covering material comprising a layer of felt base material impregnated with a coumarone resin in amount equal to from 70 to 90% of the dry weight of the felt, and a layer of a wear resisting material containing from about 25 to 50% by weight of a vinyl resin secured directly to said base with some of the fibers of the base partially embedded in said wear resisting material.

4. A covering material comprising a layer of felt base material impregnated with a coumarone resin in amount equal to about 80% of the dry weight of the felt, and a layer of a wear resisting material containing from about 25 to 50% by weight of a vinyl resin secured directly to said base with some of the fibers of the base partially embedded in said wear resisting material, said coumarone resin having a melting point at least as high as the melting point of the vinyl resin.

5. A covering material comprising a layer of felt base material impregnated with a saturant containing a major portion of coumarone resin and in amount equal to about 80% of the dry weight of the felt, and a layer of a wear resisting material containing from about 25 to 50% by weight of a vinyl resin, said wear resisting material having a melting point of at least 210° F. and said coumarone resin having a melting point at least as high as that of the vinyl resin.

6. A covering material comprising a layer of felt base material impregnated with a coumarone resin in amount equal to about 80% of the dry weight of the felt and a layer of a wear resisting material containing from about 25 to 50% by weight of a vinyl resin of the class consisting of the polymers and copolymers of vinyl chloride and vinylidene chloride with vinyl acetate, vinyl alcohol, and ethylacrylate, said wear resisting material having a melting point of at least 210° F. and said coumarone resin having a melting point at least as high as that of the vinyl resin, some of the fibers of the felt base being partially embedded in the wear resisting composition.

7. A covering material comprising a layer of felt base material impregnated with a coumarone resin in amount equal to about 80% of the dry weight of the felt and a layer of a wear resisting material containing from about 25 to 50% by weight of polyvinyl chloride secured directly to said felt with some of the fibers of said base partially embedded in said wear resisting material.

8. The method of producing a covering material comprising the steps of saturating a felt base material with a saturant containing a major portion of coumarone resin in amount equal to from 70 to 90% of the dry weight of the felt, applying to one surface of the saturated felt a layer of vinyl resin composition and thereafter subjecting the assembled layers to pressure while at a temperature at least as high as the melting point of the coumarone resin.

9. The method of producing a covering material comprising the steps of saturating a felt base material with a saturant containing a major portion of coumarone resin in amount equal to from 70 to 90% of the dry weight of the felt, applying to one surface of the saturated felt a layer of vinyl resin composition, applying a sheet of waxed paper to the exposed surface of said wear resisting layer, thereafter subjecting the assembly to heat and pressure at a temperature above the melting points of both the vinyl resin composition and the saturant and stripping the sheet of waxed paper from the wear resisting layer after the pressing operation.

WALTER E. BENEDICT.
EUGENE B. McBRIDE.

REFERENCES CITED

The following references are of record in the file of this patent:

UNITED STATES PATENTS

| Number | Name | Date |
|---|---|---|
| 1,849,867 | Eckert | Mar. 15, 1932 |
| 2,204,772 | Rivkin et al. | June 18, 1940 |
| 2,299,066 | Berger | Oct. 20, 1942 |
| 2,430,934 | Kemmler et al. | Nov. 18, 1947 |
| 2,434,974 | Woerner | Jan. 27, 1948 |
| 2,460,571 | Chaffee | Feb. 1, 1949 |

OTHER REFERENCES

"Cumar in Plastics and Coatings," by J. A. Kenney, reprint from Plastic Products, August 1934 (4 pages).